United States Patent
Glasgow et al.

(10) Patent No.: US 10,007,696 B2
(45) Date of Patent: *Jun. 26, 2018

(54) FEED FOR EXPECTING ENTITIES FOR ADDRESS BOOKS

(71) Applicant: AT & T Intellectual Property I, L.P., Atlanta, GA (US)

(72) Inventors: Jay Oliver Glasgow, Acworth, GA (US); Precia Carraway, Atlanta, GA (US)

(73) Assignee: A T & T INTELLECTUAL PROPERTY I, LP., Atlanta, GA (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/556,823

(22) Filed: Dec. 1, 2014

(65) Prior Publication Data

US 2015/0088918 A1     Mar. 26, 2015

Related U.S. Application Data

(63) Continuation of application No. 12/638,497, filed on Dec. 15, 2009, now Pat. No. 8,903,790.

(51) Int. Cl.
*G06F 17/30* (2006.01)
*G06Q 10/10* (2012.01)

(52) U.S. Cl.
CPC .. *G06F 17/30386* (2013.01); *G06F 17/30091* (2013.01); *G06Q 10/109* (2013.01)

(58) Field of Classification Search
CPC ............... G06F 17/30091; G06F 17/30386
USPC ................................................. 707/705, 706
See application file for complete search history.

(56) References Cited

U.S. PATENT DOCUMENTS

| | | | | |
|---|---|---|---|---|
| 6,018,641 | A | * | 1/2000 | Tsubouchi et al. .......... 340/10.3 |
| 8,458,064 | B1 | * | 6/2013 | Dobbins ......................... 705/35 |
| 2003/0131103 | A1 | * | 7/2003 | Deslandes .......... G07B 17/0008 709/224 |
| 2008/0021885 | A1 | * | 1/2008 | Jones .............................. 707/3 |
| 2008/0146194 | A1 | * | 6/2008 | Yang et al. ................... 455/411 |

* cited by examiner

*Primary Examiner* — Baoquoc N To
(74) *Attorney, Agent, or Firm* — Fay Kaplun & Marcin, LLP

(57) ABSTRACT

A feeding module for an address book includes a processor and a memory. The processor receives at least one search parameter. The processor accesses information sources to find existing entities and expecting entities that match the at least one search parameter. The memory stores the found existing entities and the found expecting entities. The feeding module forwards the found existing entities and the found expecting entities to an address book to be displayed.

19 Claims, 3 Drawing Sheets

FEED FOR EXPECTING ENTITIES FOR ADDRESS BOOKS

BACKGROUND

A user may have access to a Yellow Pages in which information regarding existing business entities may be found. The user may also have an electronic address book which has access to the Yellow Pages. The user may choose to include select existing business entities as contacts. However, the user is limited to existing businesses from the access to the Yellow Pages.

SUMMARY OF THE INVENTION

The exemplary embodiments of the present invention describe a feeding module for an address book comprising a processor and a memory. The processor receives at least one search parameter. The processor accesses information sources to find existing entities and expecting entities that match the at least one search parameter. The memory stores the found existing entities and the found expecting entities. The feeding module forwards the found existing entities and the found expecting entities to an address book to be displayed.

DETAILED DESCRIPTION

Figure 1:
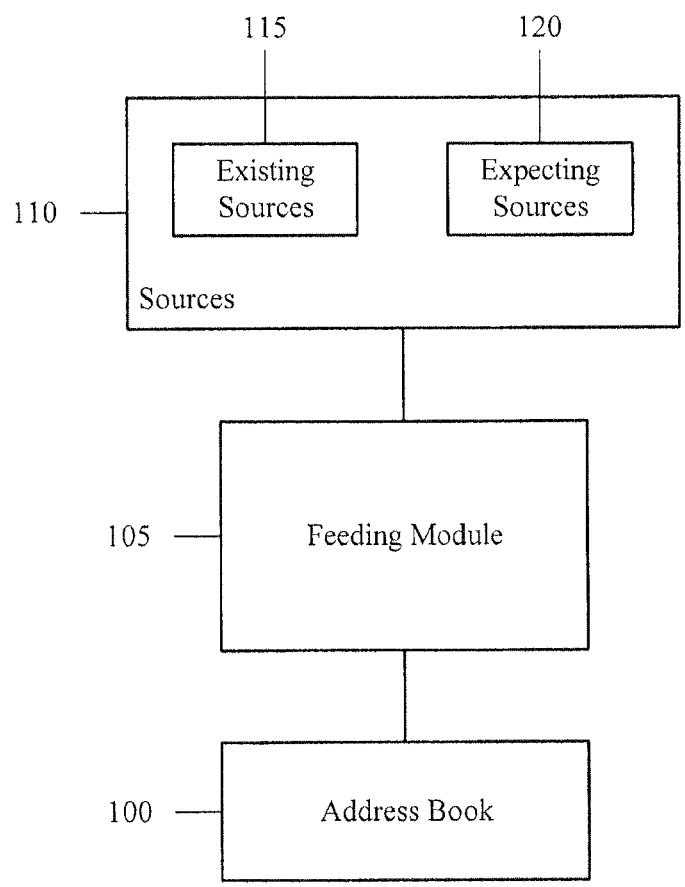
FIG. 1 shows a feed system for an address book according to an exemplary embodiment.

The exemplary embodiments may be further understood with reference to the following description and the appended drawings, wherein like elements are referred to with the same reference numerals. The exemplary embodiments describe a feed system and method for providing data relating to existing businesses and expecting businesses to an address book. The exemplary embodiments further describe the feed system being configured to provide notifications for the expecting businesses. The address book, feed system, contacts, existing businesses, expecting business, and related methods will be discussed in further detail below.

It should be noted that the exemplary embodiments describe the address book being used to store information relating to business contacts. However, it should be noted that the address book may store information for non-business oriented contacts. As will be described in further detail below, the contacts to be included in the address book may be for existing and expecting business contacts. Accordingly, the address book of the exemplary embodiments may similarly store and include contacts that are non-business oriented (e.g., personal contacts).

FIG. 1 shows a feed system for an address book 100 according to an exemplary embodiment. The address book 100 may enable a user to add contacts manually or automatically. Contacts may be added manually when the user inputs specified information relating to the contacts through a user interface of the address book 100. Contacts may be added automatically when the user selects to enable an outside user to input contact data. The contacts of the address book 100 may include individuals or entities. According to an exemplary embodiment, the address book 100 may be a personalized Yellow Pages (PYP) in which the user may selectively include business oriented contacts. The feed system may include a feeding module 105 that has access to business entity sources 110.

As described above, the address book 100 may be configured to add contacts manually and/or automatically. The feeding module 105 may be respectively configured to search through the sources 110 and add the contact data as a function of the input parameter (e.g., manual or automatic). In a first exemplary embodiment, the address book 100 may be a PYP in which the user may configure the address book 100 to add contacts manually when the user performs a search and selects particular search results to be incorporated into the address book 100. In a second exemplary embodiment, the address book 100 may have access to a Yellow Pages so that a search may be performed and also select particular search results to be incorporated into the address book 100.

The feeding module 105 may have access to the sources 110 which may include existing sources 115 and expecting sources 120. The existing sources 115 may be, for example, a Yellow Pages that includes information relating to a business entity such as a telephone number, a fax number, an address, hours of operation, etc. The existing sources 115 may also include further sources which store information relating to business entities. For example, the existing sources 115 may include a registry of businesses that operate in a given location (e.g., town, city, state, etc.). It should also be noted that the existing sources 115 may be public or private. For example, the Yellow Pages and a city registry may be accessed publicly. In another example, a private source may include a restricted registry in which authentication is required to be accessed.

The search of the existing sources 115 may be performed with a set of parameters. For example, a user may perform a search for existing business entities in a specified location (e.g., local search area). In another example, a user may perform a search for existing business entities that are related to a particular field (e.g., electronics, telecommunications, household services, etc.). The search may further combine the parameters to be searched to narrow a set of results that are found. For example, a user may include more than one criteria for a search prior to performing the search. In another example, a user may first search for results of a first criteria and then perform a second search of the results for a second criteria.

The expecting sources 120 may be any source that includes information of a business entity that will be opening at a future time. The expecting sources 120 may include information substantially similar to the information of the existing sources 115 such as contact information. The expecting sources 120 may also include public and private information. For example, a proprietary database storing expecting businesses may be privately run and provided access to authorized users. In another example, a government operated database of expecting businesses may be publicly accessed without an authentication requirement.

According to the exemplary embodiments, the address book 100 may be configured to perform functionalities beyond merely a search of the sources 110. In the first example described above relating to the search, the address book 100 may display the search results to the user. For example, the search results may be shown in a pop up window, a new window, a predetermined location of the address book 100, etc. with a set of options for each result.

When the address book 100 is configured for manual inclusion of contacts, each result may include an option to include a particular result into the contacts of the address book 100. The results of the search may also be configured with an option for the user to directly access the information of the search result. For example, the direct access of the business entity may be to redirect the user to a home page of the business. Thus, a new browser may be launched by the address book 100 for the user.

The feeding module 105 may also be configured for further functionalities in conjunction with the address book 100. In a first example, a user may select an expecting business entity and receive updates relating to the expecting business. The address book 100 may include an option to initiate this option. Thus, when additional information or edited information is received for the expecting business, the address book 100 may show that the selected expecting business has an alert. This functionality may be restricted to authorized users, in particular if the existing source 120 that stores the information is only accessible by authorized users.

In a second example, the feeding module 105 may push a request for notification. That is, when the expecting business becomes an existing business (i.e., business is open), the feeding module 105 may relay the information to the address book 100 so that an alert may be shown to the user on a user interface of the address book 100. This functionality may also be restricted to authorized users, in particular if the existing source 120 that stores the information is only accessible by authorized users.

In a third example, the feeding module 105 may be configured to provide data to an owner of the expecting business. If an expecting business is selected for notifications, statistical data may be compiled and provided to the owner. This functionality may also be restricted to authorized users who subscribe for this service. Thus, if the owner is a subscriber, the owner may receive the statistical data which may include, for example, a number of hits that the expecting business entry in the expecting sources 120 has received. The statistical data may further include information of the user. If the user of the address book 100 selects to be alerted and also selects to provide information, the statistical data may further show contact information of the user of the address book 100. Thus, the owner of the expecting business may be able to provide news regarding the business to the user.

It should be noted that the feeding module 105 may also be used for further purposes. For example, the address book 100 may include a search field for news articles or sales items. The feeding module 105 may search further sources that include data related to the search field type. In conjunction, the feeding module 105 may access the sources 110 for related existing and/or expecting business entities. The user interface of the address book 100 may include a predetermined location to show the related business entities. The address book 100 may also be configured to prompt the user whether to display the business entity search results from a search of a different nature (e.g., news, sales, etc.).

Figure 2:
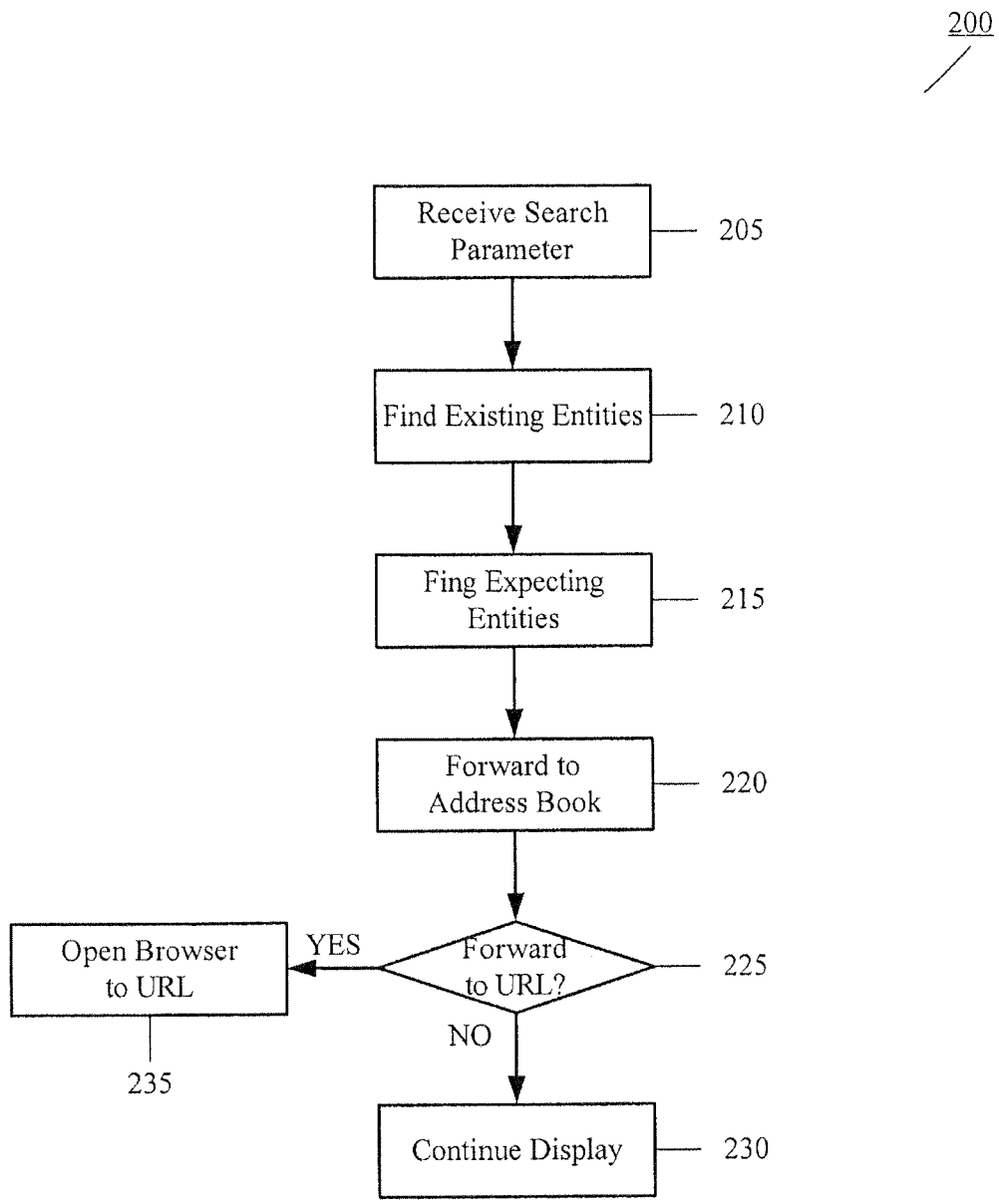
FIG. 2 shows a method for feeding data to an address book according to an exemplary embodiment.

FIG. 2 shows a method 200 for feeding data to the address book 100 via the feeding module 105 according to an exemplary embodiment. Specifically, the method 200 relates to when a search is performed by the user of the address book 100 to find business entities. The method 200 will be described with reference to the feed system and address book 100 of FIG. 1.

In step 205, the user enters a search parameter in a search field on the user interface of the address book 100 which is received by the feeding module 105. As discussed above, the search parameter may include a plurality of criteria. The criteria may include, for example, a location for search, a type of business practice, an hours of operation, an expectant opening date, etc.

In step 210, the feeding module 105 accesses the sources 110 including the existing sources 115 to find existing entities that match the search parameter received from the address book 100. As described above, the existing sources 115 may be publicly or privately accessed. Thus, depending on an authentication of the user of the address book 100, the feeding module 105 may be restricted to select ones of the existing sources 115 in finding existing entities.

In step 215, the feeding module 105 accesses the sources 110 including the expecting sources 115 to find expecting entities that match the search parameter received from the address book 100. As described above, the expecting sources 115 may also be publicly or privately accessed. Thus, depending on an authentication of the user of the address book 100, the feeding module 105 may be restricted to select ones of the expecting sources 115 in finding expecting entities.

In step 220, the feeding module 105 forwards the search results to the address book 100. The address book 100 may receive the search results and display the results to the user on the user interface of the address book 100. As discussed above, the address book 100 may show the results in a variety of ways such as opening a window with the search results. Also, as discussed above, the search results may include options associated with each search result.

In step 225, a determination is made whether the user is to be redirected to the search result such as to a universal resource locator (URL) that stores a web page for the business entity. One of the options included in the results shown to the user may be to forward the user to the URL of the business entity. If the user chooses not to be redirected, the method 200 continues to step 230 where the search results are continued to be displayed. If the user selects to be redirected, the method 200 continues to step 235 where the address book 100 may open a new browser to the URL.

Figure 3:
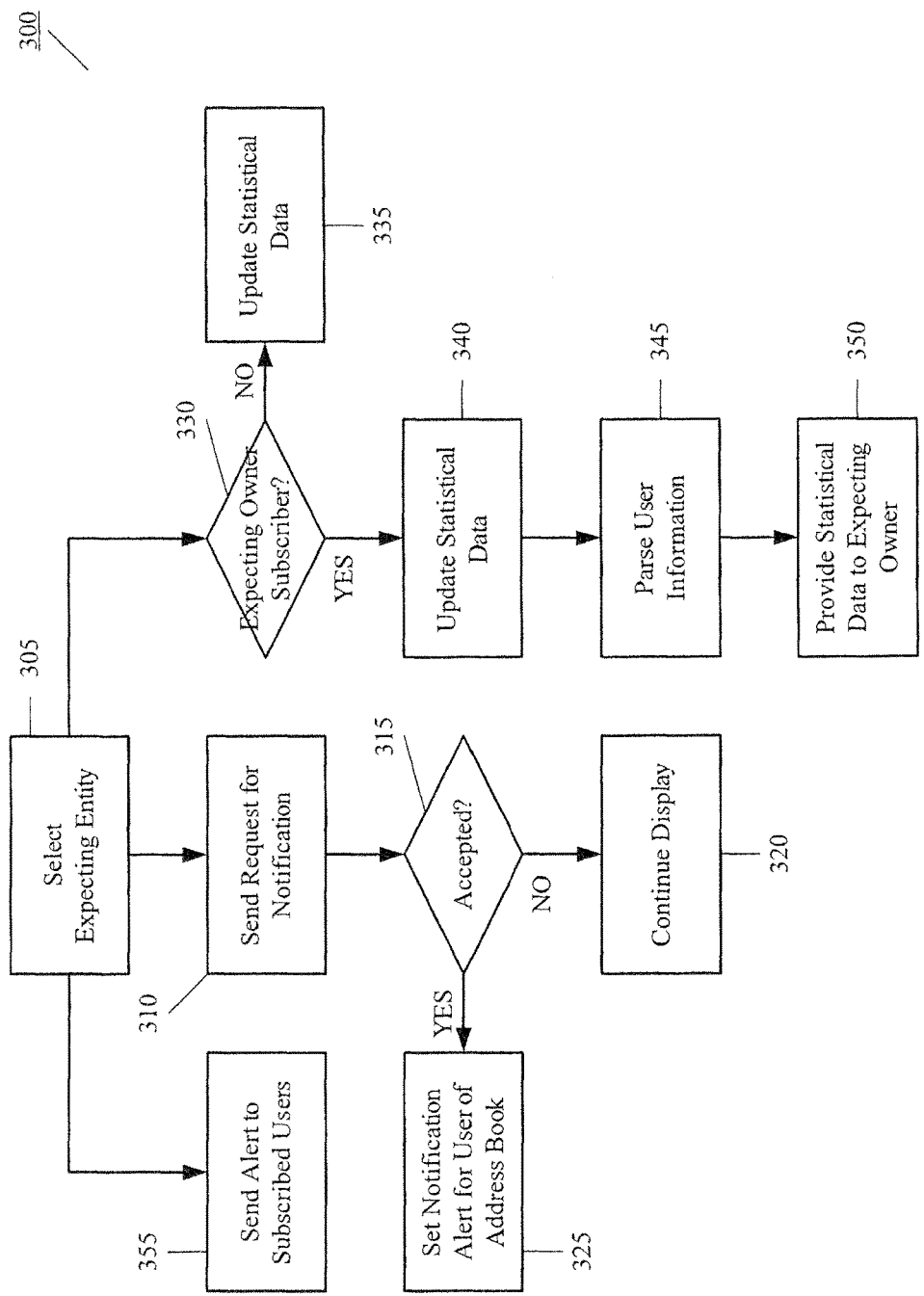
FIG. 3 shows a method for notifications according to an exemplary embodiment.

FIG. 3 shows a method 300 for notifications according to an exemplary embodiment. Specifically, the method 300 relates to when a search is performed by the user of the address book 100 to find expecting business entities and subsequent functionalities that are performed by the feeding module 105 in conjunction with the address book 100. The method 300 will be described with reference to the feed system and address book 100 of FIG. 1.

In step 305, a user selects an expecting business entity that is found from a search. The search may be from the user performing the method 200 of FIG. 2. The selection of the business entity may trigger a variety of further functionalities that may be performed by the feeding module 105.

In step 310, the feeding module 105 sends a request to the user of the address book 100 for notification. The notification may relate specifically to the selected business entity that was selected in step 305. The notification may relate to a variety of different alerts. For example, the notification may be for when the expecting business entity is to open, when the information of the expecting business is updated or new information is added, etc.

In step 315, the feeding module 315 receives the determination selected at the address book 100 by the user to accept the notification functionality. When the user does not select to be notified, the method 300 continues to step 320 where the address book 100 continues to show the display of the search results. When the user selects to be notified, the method 300 continues to step 325 where the feeding module 105 updates the parameters for the user regarding the selected expecting business entity. Thus, when the notification is triggered, the feeding module 105 may push the data to the address book 100 to be displayed for the user.

Going back to step 305, when the expecting entity is selected by the user of the address book 100, the method 300 may continue to step 330 where the feeding module 105 may further determine if the owner of the expecting entity is a subscriber to the services provided by the feeding module 105. If the owner is not a subscriber, the feeding module 105 updates statistical data that the user has selected the owner's expecting business.

If the owner is a subscriber, the method 300 continues to step 340 where the feeding module 105 updates the statistical data for the expecting business such as that performed in step 335. The feeding module 105 may have all related data of the user of the address book. Thus, in step 345, the feeding module 105 parses the user information to omit predetermined portions of the user information. For example, if the user of the address book 100 selects to not provide any personal data to the owner of the expecting business, the feeding module 105 may merely notate that one of the users has shown interest in the expecting business. In another example, if the user of the address book 100 selects to provide certain personal data (e.g., name, address, telephone number, etc.), the feeding module 105 may parse the user information to provide only those that are selected by the user. Thus, in step 350, the feeding module 105 may provide the statistical data to the owner of the expecting business.

The feeding module 105 may be configured to provide a functionality for subscribed users that select to be informed of all expecting business entities. For example, a telecommunications firm may be interested in all incoming businesses to contact the owners of the expecting business to try and land a contract to provide its services. The subscribed user may define an area or type of expecting business to be alerted. Thus, in step 355, the feeding module 105 may send an alert to all subscribed users of the service of the expecting business entities when the search parameters match that of the subscribed user.

The exemplary embodiments provide a user of an address book with data relating to existing businesses and expecting businesses. The feeding module may find the existing businesses that match search criteria entered by the user, through the address book, which may be a PYP or have access to a Yellow Pages or other business directory. The feeding module may also find the expecting businesses that match search criteria entered by the user by accessing public and/or private information sources (e.g., databases) that store data relating to incoming businesses.

The exemplary embodiments further provide additional options for the expecting businesses. In a first example, the feeding module may include an option to send notifications to the address book when an alert related to a selected expecting business is triggered. In a second example, the feeding module may compile statistical data for an owner of an expecting business. When the owner is a subscriber to this functionality, the feeding module may provide the statistical data to the owner. In a third example, the feeding module may provide an alert to subscribed users who select to be informed when any business is expected to be incoming. The alert may be narrowed to provide only the expecting businesses that match a given set of criteria such as a local search area, a type of business, etc.

Those skilled in the art will understand that the above described exemplary embodiments may be implemented in any number of manners, including as a separate software module, as a combination of hardware and software, etc. For example, the feeding module 105 may be embodied as a program containing lines of code that, when compiled, may be executed on a processor of a server.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A non-transitory computer readable storage medium including a set of instructions executable by a processor, the set of instructions, when executed by the processor, causing the processor to perform operations comprising:
   receiving a search parameter;
   accessing information sources to find existing entities and future entities that match the search parameter, wherein the future entities are entities that will be opening at a future time;
   storing the found existing entities and the found future entities; and
   forwarding the found existing entities and the found future entities to an address book to be displayed.

2. The non-transitory computer readable storage medium of claim 1, wherein the information sources for the existing entities are one of publicly accessed and privately accessed.

3. The non-transitory computer readable storage medium of claim 1, wherein the information sources for the future entities are one of publicly accessed and privately accessed.

4. The non-transitory computer readable storage medium of claim 1, wherein the operations further comprise:
   receiving an indication to open a source for a selected one of the found existing entities and the found future entities.

5. The non-transitory computer readable storage medium of claim 1, wherein the operations further comprise:
   sending notifications to the address book relating to a selected one of the found future entities.

6. The non-transitory computer readable storage medium of claim 5, wherein the notifications relate to one of an update and a change to information of the selected one of the found future entities.

7. The non-transitory computer readable storage medium of claim 1, wherein the operations further comprise:
   updating statistical data related to a selected one of the found future entities.

8. The non-transitory computer readable storage medium of claim 6, wherein the operations further comprise:
   forwarding the statistical data to an owner of the selected one of the found future entities.

9. The non-transitory computer readable storage medium of claim 6, wherein the statistical data includes one of a counter of interested users and personal information.

10. The non-transitory computer readable storage medium of claim 1, wherein the operations further comprise:
    sending a notification to subscribed users for all found future entities matching predetermined criteria.

11. A feed system, comprising:
    a processor receiving a search parameter, the processor accessing information sources to find existing entities and future entities that match the search parameter, wherein the future entities are entities that will be opening at a future time; and
    a memory storing the found existing entities and the found future entities, wherein the processor forwards the found existing entities and the found future entities to an address book to be displayed.

12. The feed system of claim 11, wherein the information sources for the existing entities are one of publicly accessed and privately accessed.

13. The feed system of claim 11, wherein the information sources for the future entities are one of publicly accessed and privately accessed.

14. The feed system of claim 11, wherein the processor further receives an indication to open a source for a selected one of the found existing entities and the found future entities.

15. The feed system of claim 11, wherein the processor further sends notifications to the address book relating to a selected one of the found future entities.

16. The feed system of claim 15, wherein the notifications relate to one of an update and a change to information of the selected one of the found future entities.

17. The feed system of claim 11, wherein the processor updates statistical data related to a selected one of the found future entities.

18. The feed system of claim 17, wherein the processor forwards the statistical data to an owner of the selected one of the found future entities.

19. The feed system of claim 11, wherein the processor sends a notification to subscribed users for all found future entities matching predetermined criteria.

* * * * *